UNITED STATES PATENT OFFICE.

JAN LAGUTT, OF BASEL, SWITZERLAND, ASSIGNOR TO CHEMISCHE FABRIK VORMALS SANDOZ, OF BASEL, SWITZERLAND, A CORPORATION OF SWITZERLAND.

PRODUCTION OF STABLE SALTS OF DIMETHYL-P-AMINOPHENOL AND P-OXYPHENYL-TRIMETHYLAMMONIUM.

1,144,141.   Specification of Letters Patent.   Patented June 22, 1915.

No Drawing.   Application filed August 31, 1914.   Serial No. 859,294.

*To all whom it may concern:*

Be it known that I, JAN LAGUTT, Ph. D., a citizen of the Swiss Republic, residing at Basel, Switzerland, have invented new and useful Improvements in the Production of Stable Salts of Dimethyl-P-Aminophenol and P-Oxyphenyltrimethylammonium, of which the following is a specification.

In the methylation of p-aminophenol considerable quantities of a mixture of dimethyl-p-aminophenol and a compound of p-oxyphenyltrimethylammonium such as p-oxyphenyltrimethylammoniumhydroxid, are always formed besides the monomethyl-p-aminophenol (metol) which is the valued photographic developer.

Although the suitability of the dimethyl-p-aminophenol as a developer was recognized as far back as the German patent specification No. 69,582 this body has not up to the present found employment in photography because great difficulties are encountered in isolating it from the methylation products of p-aminophenol owing to the easy solubility of its salts and their tendency to oxidize. Similar conditions hinder the separation of the p-oxyphenyltrimethylammonium compounds.

My experiments have shown that both dimethyl-p-aminophenol and p-oxyphenyltrimethylammonium compounds can be very conveniently isolated from solutions of their salts by adding ferrocyanids to said solutions and acidifying strongly; the acid hydro-ferrocyanid salts of the composition,

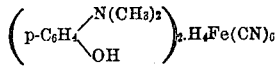

and

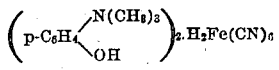

separate out very quickly and completely. P-aminophenol and monomethyl-p-aminophenol on the contrary give no precipitates with ferrocyanids in acid solution.

According to the present invention the said bases, dimethyl-p-aminophenol and p-oxyphenyltrimethylammonium compounds are precipitated as acid ferrocyanids from strong mineral acid solution and the said ferrocyanids may be isolated separately from the mixture of the acid ferrocyanids by extracting their solution (kept weakly alkaline) with a suitable organic solvent, to remove the dimethyl-p-aminophenol, and then separating the pure ferrocyanids respectively from the residue and the extract.

In order to illustrate the new process more fully, the following examples are given:

Example 1: To a mixture resulting from the methylation of 100 kilos of p-aminophenol, which mixture besides dimethyl-p-aminophenol and p-oxyphenyltrimethyl-ammonium compounds may contain monomethyl-p-aminophenol and unaltered p-aminophenol in the form of their mineral acid salts dissolved in about 500 liters of water, add a concentrated solution of 60 kilos of crystallized potassium ferrocyanid and acidify with sulfuric acid until a strongly acid reaction is obtained on Congo paper. The acid ferrocyanids of the dimethyl-p-aminophenol and p-oxyphenyltrimethylammonium separate out as a fine, shining crystalline powder. When a filtered test portion gives no further precipitation on addition of further potassium ferrocyanid, the liquid is left to stand for about 12 hours longer to complete the crystallization. The precipitate is then filtered off and washed with a little cold water.

It may here be mentioned that alkali ferricyanids also separate the acid ferrocyanids of dimethyl-p-aminophenol and p-oxyphenyltrimethylammonium from acid solutions of these two bases with simultaneous partial oxidation of the same.

Example 2: 100 kilos of the mixture of acid ferrocyanids of dimethyl-p-aminophenol and p-oxyphenyltrimethyl-ammonium obtained according to Example 1 are stirred into 3 kilos of sodium hydrosulfite and 300 liters of water, and caustic soda solution is added until a weak alkaline reaction is just perceptible on brilliant yellow paper. The dimethyl-p-aminophenol is then extracted by shaking with 200 kilos of benzene, the base being removed from the benzene extract from time to time by dilute sulfuric acid, and the extraction continued up to complete exhaustion of the initial solution which is always kept weakly alkaline. Three agitations with benzene are generally sufficient. The remaining solution then only contains p-oxyphenyltrimethylammonium and sodium ferrocyanid, and on acidifying it with a mineral acid, pure ferrocyanid of the composition,—

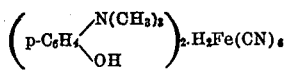

is precipitated in fine, shining, yellowish-white plates. Incineration gave 15.50% $Fe_2O_3$; calculated amount 15.44%.

The acid extracts of the benzene extract yield on precipitation with about 55 kilos of ferrocyanid of potassium and subsequent acidification, pure acid ferrocyanid of dimethyl-p-aminophenol,

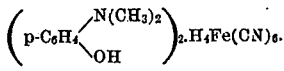

This salt crystallizes out of not too concentrated solutions in shining yellowish-white plates. Incineration showed 16.20% $Fe_2O_3$; calculated amount 16.32%.

The extraction of the dimethyl-p-aminophenol can also be performed with other suitable organic solvents, as for example ether.

Both the ferrocyanids are very difficultly soluble in cold water, but dissolve easily in hot water. On boiling the aqueous solutions, decomposition occurs with splitting off of prussic acid, so that temperatures greater than 70° C. must be avoided in recrystallizing.

From the ferrocyanid obtainable by the above processes the corresponding bases can be isolated and transformed into other pure salts by known methods of conversion. Thus for example the sulfate of dimethyl-p-aminophenol,

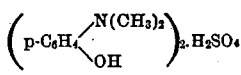

can be obtained as a white crystalline powder of melting point 214–215° C., very soluble in water and difficultly soluble in alcohol.

The chlorid of p-oxyphenyltrimethylammonium crystallizes from alcohol in small colorless crystals melting at 239°–240° C. When distilled in vacuo it is converted almost quantitatively into dimethyl-p-aminophenol and methyl chlorid is split off.

I claim:

1. The process of producing the acid ferrocyanids of dimethyl-p-aminophenol and p-oxyphenyltrimethylammonium which comprises precipitating such salts from a mineral acid solution containing dimethyl-p-aminophenol and p-oxyphenyltrimethylammonium compound and then separating said precipitated salts, substantially as and for the purpose described.

2. The process of producing the acid ferrocyanids of dimethyl-p-aminophenol and p-oxyphenyltrimethylammonium which comprises precipitating such salts from a mineral acid solution containing dimethyl-p-aminophenol and p-oxyphenyltrimethylammonium compound and then separating said salts by extracting an alkaline solution of said precipitated salts with a suitable organic solvent substantially as and for the purpose described.

3. The process of producing the acid ferrocyanids of dimethyl-p-aminophenol and p-oxyphenyltrimethylammonium which comprises precipitating such salts from a mineral acid solution containing dimethyl-p-aminophenol and p-oxyphenyltrimethylammonium compound, then separating said salts by extracting an alkaline solution of said precipitated salts with a suitable organic solvent and then precipitating the acid ferrocyanid of dimethyl-p-aminophenol from said extract, substantially as and for the purpose described.

4. The improvement in the art of producing the acid ferrocyanids of dimethyl-p-aminophenol and p-oxyphenyltrimethylammonium which comprises precipitating such salts by adding ferrocyanid to a mineral acid solution containing dimethyl-p-aminophenol and p-oxyphenyltrimethylammonium compound, substantially as and for the purpose described.

5. As a new product, the crystalline substance capable of being produced by precipitation from an acid solution containing dimethyl-p-aminophenol by means of ferrocyanid and comprising the acid ferrocyanid of dimethyl-p-aminophenol substantially as and for the purpose described.

6. As a new product the crystalline substance comprising the acid ferrocyanid of dimethyl-p-aminophenol crystallizing in shining yellow-white plates and having probably the formula:

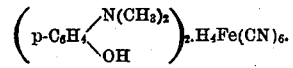

In testimony whereof I have hereunto set my hand in the presence of two subscribing witnesses.

JAN LAGUTT.

Witnesses:
MELCHIOR BOENIGER,
ARNOLD STEINER.